United States Patent [19]

Kaneda et al.

[11] Patent Number: 5,376,991
[45] Date of Patent: Dec. 27, 1994

[54] CONTROL SYSTEM

[75] Inventors: Kitahiro Kaneda, Yokohama; Hideyuki Arai, Kawasaki; Hirofumi Suda; Seiya Ota, both of Yokohama, all of Japan

[73] Assignee: Canon Kabushiki Kaisha, Tokyo, Japan

[21] Appl. No.: 195,602

[22] Filed: Feb. 14, 1994

Related U.S. Application Data

[63] Continuation of Ser. No. 81,865, Jun. 23, 1993, abandoned, which is a continuation of Ser. No. 952,461, Sep. 19, 1992, abandoned, which is a continuation of Ser. No. 659,844, Feb. 22, 1991, abandoned.

[30] Foreign Application Priority Data

Feb. 27, 1990 [JP] Japan .................................. 2-47846

[51] Int. Cl.$^5$ .................................................... G03B 13/00
[52] U.S. Cl. .................................... 354/400; 348/355
[58] Field of Search ............................ 354/400–409; 358/227; 250/201.1–201.8, 204

[56] References Cited

U.S. PATENT DOCUMENTS

| | | | |
|---|---|---|---|
| 4,804,831 | 2/1989 | Baba et al. | 354/402 |
| 4,933,700 | 6/1990 | Ikeda et al. | 354/400 |
| 4,980,715 | 12/1990 | Utagawa | 354/402 |
| 5,005,040 | 4/1991 | Norita et al. | 354/402 |
| 5,025,499 | 6/1991 | Inoue et al. | 364/165 |
| 5,084,754 | 1/1992 | Tomitaka | 358/227 |

*Primary Examiner*—David M. Gray
*Attorney, Agent, or Firm*—Robin, Blecker Daley & Driscoll

[57] ABSTRACT

A control system computes a plurality of detection data and outputs a control amount for a control target. The control system includes a detecting circuit for detecting the plurality of detection data, a first computing circuit for quantitatively computing a degree at which the plurality of detection data output from said detecting circuit conform with a preset condition in accordance with a predetermined function and generating an output function for controlling the control target, a second computing circuit for computing a centroid of an external figure which is obtained by processing an external figure of the output function, output from the first computing circuit, in accordance with predetermined approximation, and a driving section for driving the control target based on an output from the second computing circuit.

34 Claims, 11 Drawing Sheets

FIG. 6

RULES (ZO : ZERO)
1. IF (ES = B) AND (dES = ZO),
   THEN (FMS = ZO).
   (PS : POSITIVE SMALL)
2. IF (FMDIR = P), (ES = B) AND (dES = PB),
   THEN (FMS = PS).
3. IF (PFMS = P), (ES = B) AND (dES = NB),
   THEN (FMS = NS).
   (NS : NEGATIVE SMALL)
4. IF (FMDIR = N), (ES = B) AND (dES = PB),
   THEN (FMS = PS).
5. IF (PFMS = N), (ES = B) AND (dES = NB),
   THEN (FMS = PS).
   (PM : POSITIVE MIDDLE)
6. IF (FMDIR = P), (FV = B), (dFV = PB) AND (dES ≠ B),
   THEN (FMS = PS).
7. IF (PFMS = P), (FV = B) AND (dFV = NB),
   THEN (FMS = NM).
   (NM : NEGATIVE MIDDLE)
8. IF (FMDIR = N), (FV = B), (dFV = PB) AND (dES ≠ PB),
   THEN (FMS = NM).
9. IF (PFMS = N) AND (FV = B),
   THEN (FMS = PM).
   (PB : POSITIVE BIG)
10. IF (FMDIR = P), (FV = S), (dFV = PS) AND (dES ≠ PB),
    THEN (FMS = PB).
11. IF (PFMS = P), (FV = S) AND (dFV = NS),
    THEN (FMS = NB).
    (NB : NEGATIVE BIG)
12. IF (FMDIR = N), (FV = S), (dFV = PS) AND (dES ≠ PB),
    THEN (FMS = NB).
13. IF (PFMS = N), (FV = S) AND (dFV = NS),
    THEN (FMS = PB).

ES    : EDGE WIDTH
dES   : DIFFERENCE VALUE OF EDGE WIDTH
FV    : HIGH-FREQUENCY COMPONENT
dFV   : DIFFERENCE VALUE OF HIGH-FREQUENCY COMPONENTS
PFMS  : REVERSE ROTATION SPEED OF FOCUS MOTOR
FMDIR : ROTATION DIRECTION OF FOCUS MOTOR
FMS   : ROTATION SPEED OF FOCUS MOTOR
S     : SMALL
M     : MIDDLE
B     : BIG

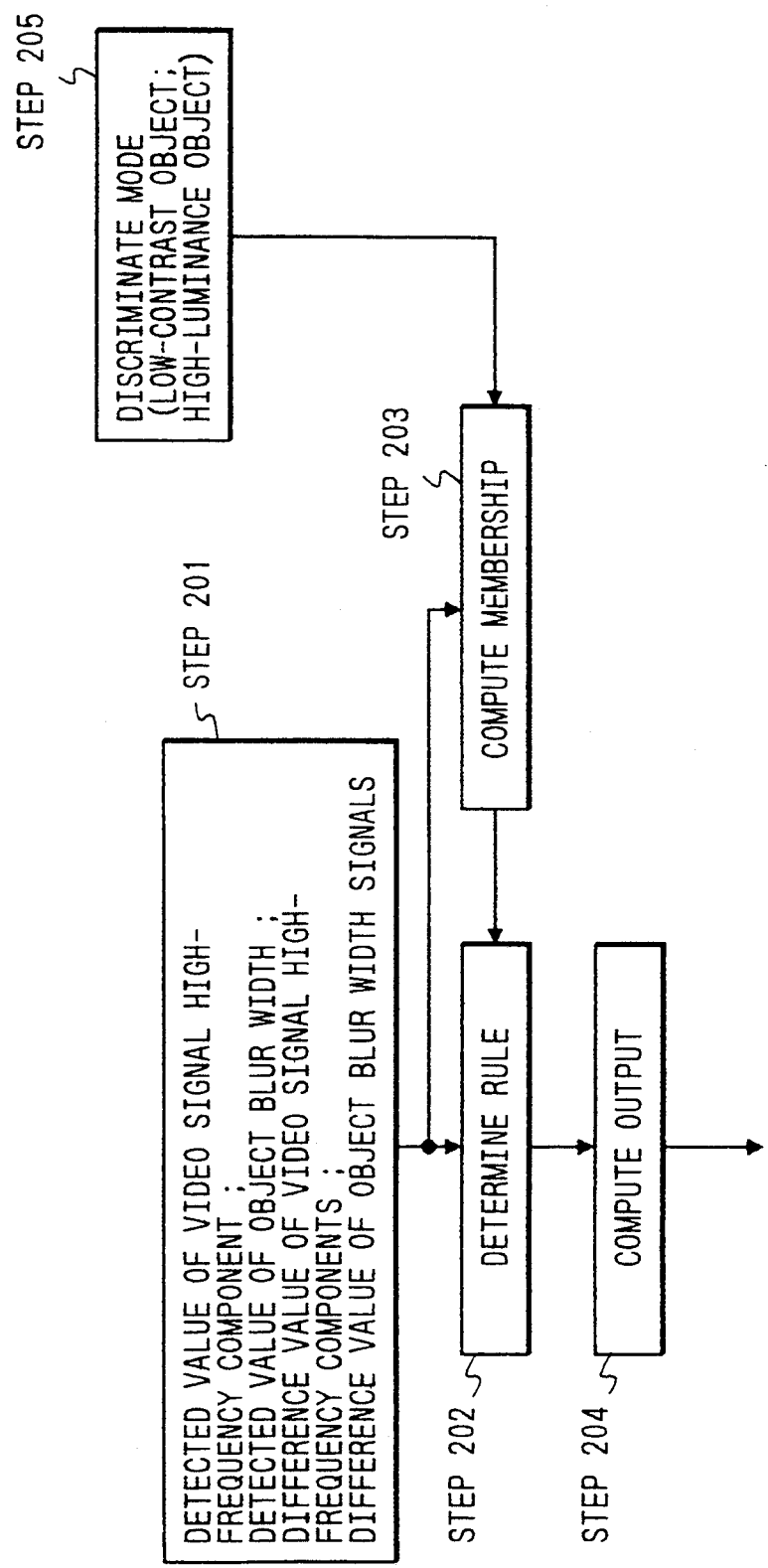

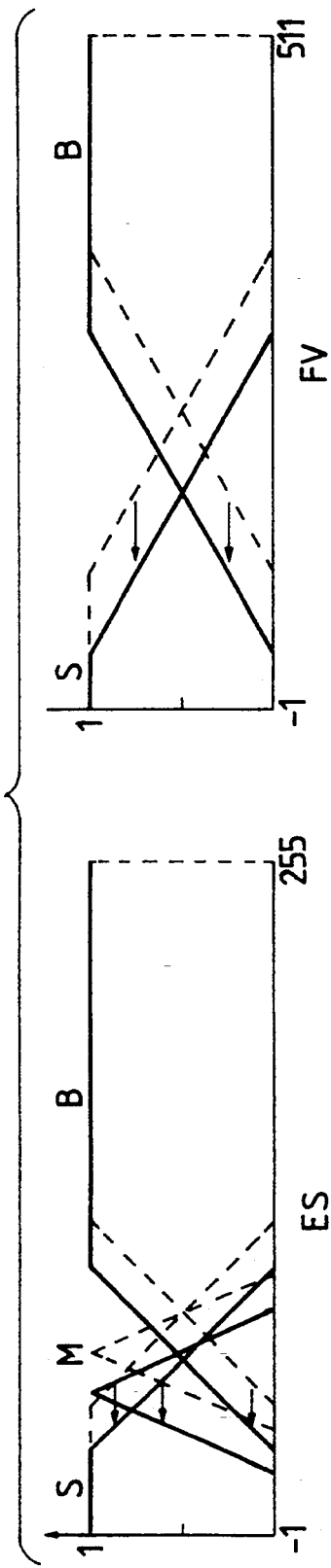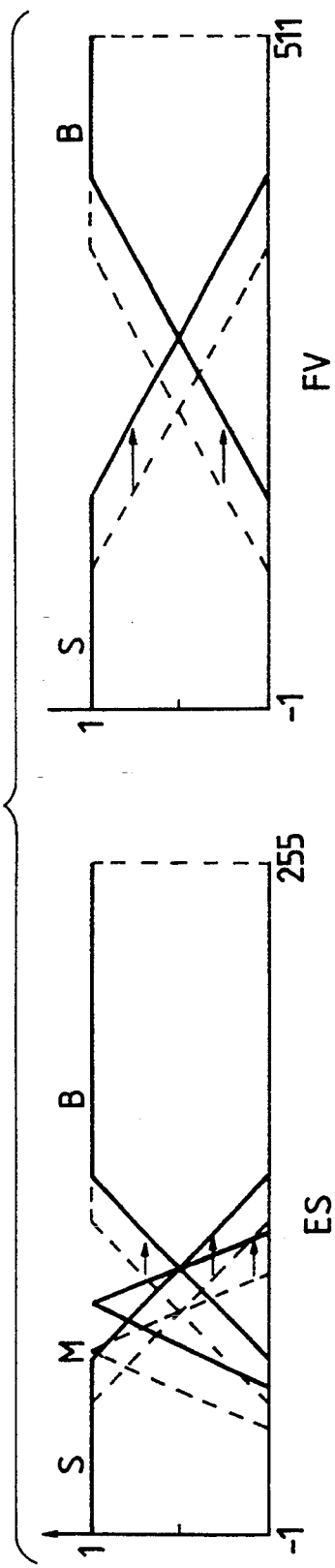
FIG. 8A LOW-CONTRAST OBJECT
FIG. 8B HIGH-LUMINANCE OBJECT

CONTROL SYSTEM

This is a continuation of prior application Ser. No. 08/081,865, filed Jun. 23, 1993, now abandoned, which is a continuation of Ser. No. 07/952,461 filed Sep. 28, 1992 (now abandoned), which is a continuation of Ser. No. 07/659,844 filed Feb. 22, 1991 (now abandoned).

BACKGROUND OF THE INVENTION

1. Field of the Invention

The present invention relates to a control system and, more particularly, to a control system suitable for application to control using a fuzzy inference.

2. Related Background Art

In the field of various control, recently, a so-called fuzzy inference is used which enables control in a natural manner and is flexibly adaptable to different situations by taking into account ambiguity, thereby achieving better control. For example, U.S. patent application Ser. No. 578,024 and U.S. patent application Ser. No. 580,195 filed by the present applicant on Sep. 5, 1990 and Sep. 10, 1990, respectively, employ the fuzzy inference.

In a control system of this type, a degree to which a plurality of data associated with control conform with preset conditions is determined using a predefined membership function. The control amount is computed from the determination result and a predefined output function.

Namely, a plurality of control data are detected, substituted in a membership function which is prepared in advance, and collated with preset rules. A degree to which the detection data conforms with the rules is calculated in a quantitative manner. The calculation result is substituted in the membership function to produce an output membership function suitable for various situations, thus computing the control amount. More particularly, a computation is finally performed to obtain the centroid of the external figure of the output membership function, thus obtaining a control output that reflects various ambiguities.

In this manner, the control utilizing the fuzzy inference is composed of steps of membership function development, rule (conditions) determination, non-fuzzy processing for computing the control amount, and the like.

Other various types of apparatuses can be control targets having ambiguities. In the field of, e.g., the imaging apparatus such as a video camera, if a system is used in considerably various situations and the user needs to make decisions depending on his sense, as in a focusing system, it is highly effective to perform control with human factors that utilize the ambiguities described above.

Control of this type is effective not only in the imaging apparatus but can be applied to any apparatus in any field regardless of the types of control targets. Reduction in size and cost of the control system is necessary in any field, especially in the field of small commercial electronic appliances such as home electronics.

However, according to the control system described above, if the fuzzy inference is used in control, a comparatively large-scale system is required for development of the membership function, rule (conditions) determination, a non-fuzzy process for computing the control amount, and so on. This is because development of the membership function and the non-fuzzy process for computing the control amount require most advanced, complicated computation.

More particularly, the centroid of the external figure of the output membership function is calculated in the non-fuzzy process, thereby obtaining the final result. The external figure of the output membership function changes according to the rule conforming conditions and is usually very complicated. Accordingly, computation for obtaining the centroid of the external figure is very complicated and cannot be performed with ease.

Along with recent size reduction of various apparatuses, it has become more and more necessary to perform the fuzzy inference in a software manner by utilizing a one-chip microcomputer. When a one-chip microcomputer is used to accurately perform the above-described centroid computation, however, a serious problem arises as the program capacity and the processing speed are limited.

SUMMARY OF THE INVENTION

The present invention has been made to solve the problems described above. It is the first object of the present invention to reduce the size of a control system that uses fuzzy inference and to shorten the processing time.

It is the second object of the present invention to simplify the control algorithm of the control system that uses the fuzzy inference.

It is the third object of the present invention to greatly simplify an output membership function computation without degrading the precision in the fuzzy inference output by approximating the output membership function for controlling the control target, thereby decreasing the program capacity and shortening the processing time.

In order to achieve these objects, according to a preferred embodiment of the present invention, there is provided a control system for computing a plurality of detection data and outputting a control amount for a control target, comprising detecting means for detecting the plurality of detection data, first computing means for quantitatively computing a degree at which the plurality of detection data output from the detecting means conform with a preset condition in accordance with a predetermined function and generating an output function for controlling the control target, second computing means for computing a centroid of an external figure which is obtained by processing an external figure of the output function, output from the first computing means, in accordance with predetermined approximation, and driving means for driving the control target based on an output from the second computing means.

It is the fourth object of the present invention to disclose a control system for performing control using a fuzzy inference, which simplifies centroid computation for obtaining an output evaluation value by approximating the external figure of an output membership function to an appropriate figure in a non-fuzzy process in the fuzzy inference, simplifies a computation program, reduces the size thereof, enables high-speed computation processing, and reduces the program and data storage area.

It is the fifth object of the present invention to use e.g., a versatile one-chip microcomputer as a control microcomputer, thus realizing easy control using fuzzy inference in a software manner in the versatile microcomputer.

It is still another object of the present invention to provide an automatic focusing system which operates in a natural manner without malfunction regardless of the situation of an object image and which can be controlled easily.

It is still another object of the present invention to enable application of fuzzy inference with ease to an automatic focusing system which automatically keeps focusing an object having many ambiguous factors, and to realize high-speed, optimum control.

According to the present invention, there is also disclosed an automatic focusing system comprising focus state detecting means for detecting the state of focus based on an image pickup signal component that changes in accordance with the state of focus extracted from an image pickup signal, first computing means for collating detection data of the signal component with a predetermined condition and computing focus adjusting speed data based on a degree at which the detection data conforms with the predetermined condition, and focus adjusting means for adjusting a focal point based on an output from said second computing means.

It is still another object of the present invention to provide an automatic focusing system for collating a plurality of input data with a plurality of rules that are set while the data are input, thereby obtaining an evaluation value indicating a degree to which the input data conform with the rule, and for performing focusing control based on the evaluation value, in which evaluation value computation is corrected in accordance with a change in the object image, thus achieving optimum control.

The above and other objects, features, and advantages of the present invention will become apparent from the following detailed description and the accompanying drawings.

BRIEF DESCRIPTION OF THE DRAWINGS

FIG. 6 shows the rules of the fuzzy inference of the present invention;

FIG. 7 is a flow chart for explaining the focus motor speed control performed with the fuzzy inference according to the present invention;

FIGS. 8A and 8B show the control by membership function of setting conditions performed according to mode determination;

DETAILED DESCRIPTION OF THE PREFERRED EMBODIMENTS

An embodiment of a control system according to the present invention which is applied to an automatic focusing system e.g., a video camera, will be described in detail with reference to the accompanying drawings.

The automatic focusing system of this embodiment as the control target will be briefly described first.

Various methods have hitherto been developed for the automatic focusing systems of cameras. In the case of an apparatus of the kind having image sensing means for obtaining a video signal by photo-electrically converting an object image, such as a video camera or an electronic still camera, it is known that the automatic focusing system is arranged to detect the sharpness or definition of the object image from the video signal and to control the position of a focusing lens in such a way as to obtain a maximum degree of image sharpness.

Meanwhile, a method for controlling a speed at which the focusing lens is to be driven by the focusing system of the above-stated kind has been disclosed, for example, in U.S. patent application Ser. No. 500,297 filed on Mar. 27, 1990. In accordance with this method, the blur width of the edge of an object image is detected and the focusing lens driving speed is adjusted according to the detected value of the blur width.

In the case of the method for detecting focus by extracting from the video signal a signal component which varies with the state of focus, it is sometimes difficult to accurately make focus adjustment in a natural manner as the signal component fluctuates according to the object and the environment thereof.

The control operation of the focusing system therefore includes some ambiguities in itself. It may appear that a fuzzy inference which has recently begun to be used for control in various fields is effectively applicable to focusing adjustment control. It is conceivable to apply the fuzzy inference to the focusing system of this kind, for example, in the following manner: The high-frequency component of the video signal and the detected value of the blur width of the object image are processed by the fuzzy inference. Then, the automatic focusing action can be accomplished by determining the speed and direction of a focusing lens driving action on the basis of the result of the fuzzy inference process.

More particularly, membership functions are defined for the detected value of the blur width of the object image and the value of the high-frequency component of the video signal. A conformity degree with respect to the respective rules is calculated based on the functions, thereby controlling the focusing lens speed.

Figure 1:
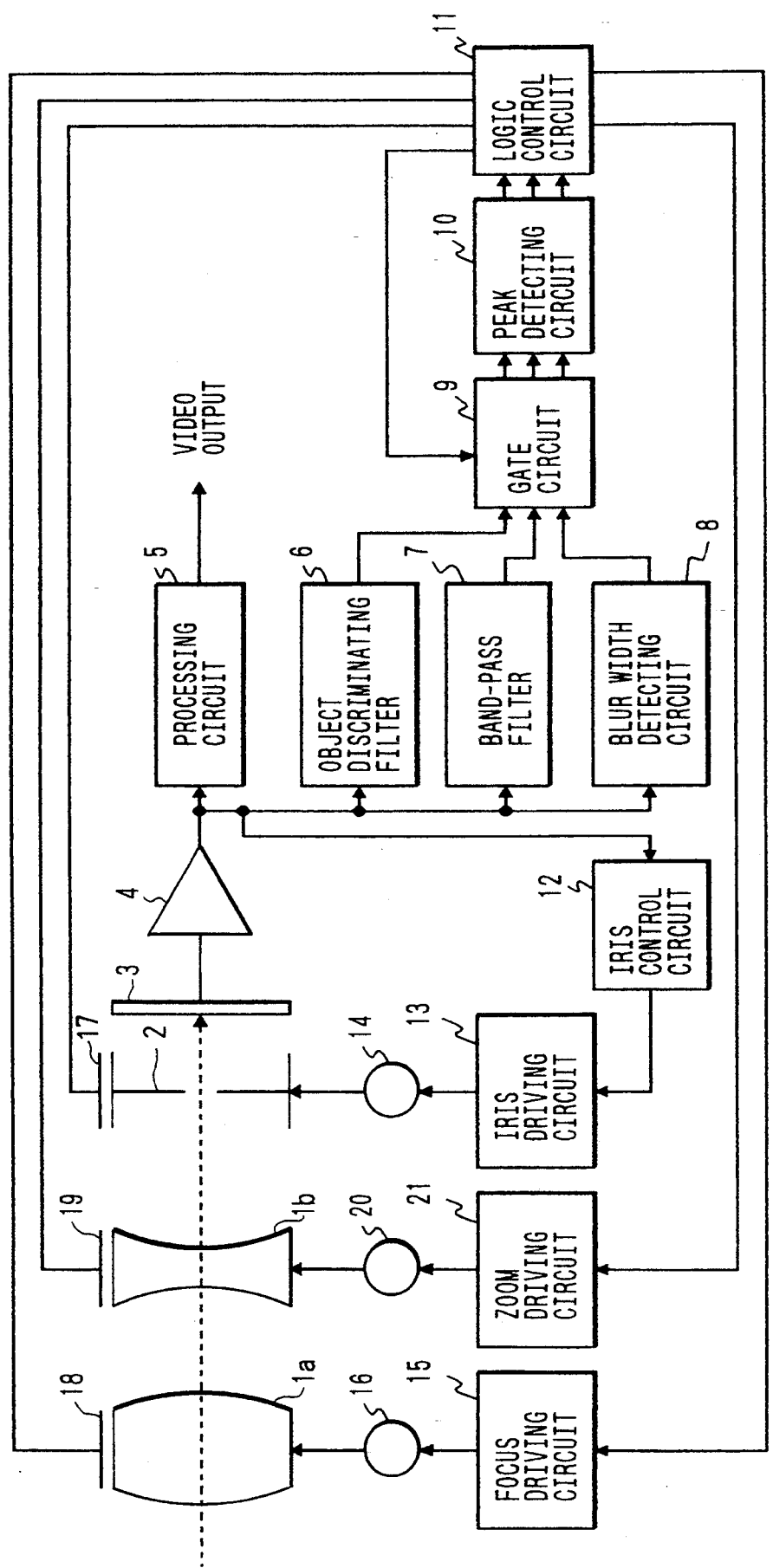
FIG. 1 is a block diagram showing the arrangement of a control system according to the present invention which is applied to an automatic focusing system such as a video camera.
Figure 2A:
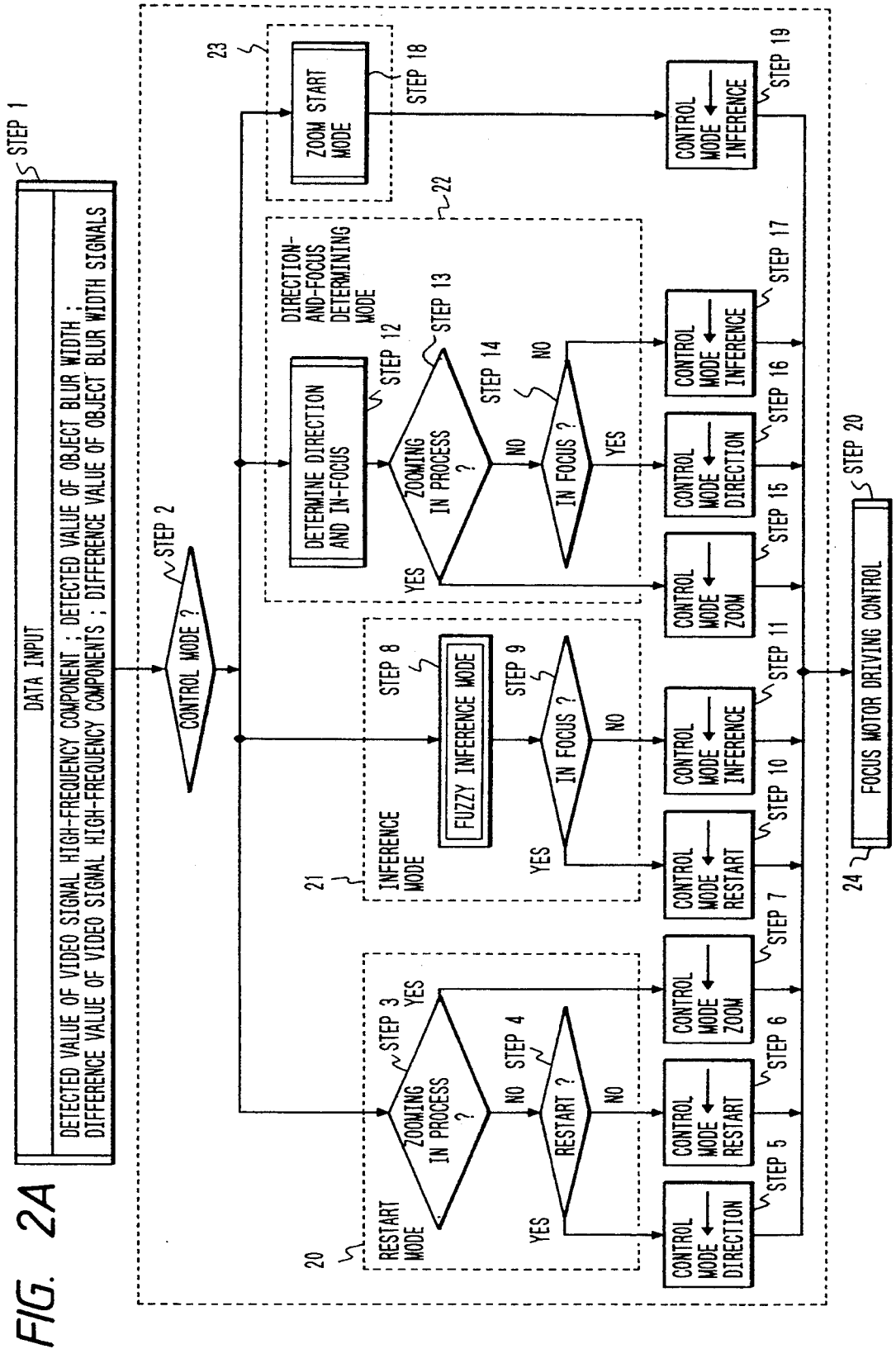
FIGS. 2A and 2B are flow charts for explaining control of the automatic focusing system according to the present invention.
Figure 2B:
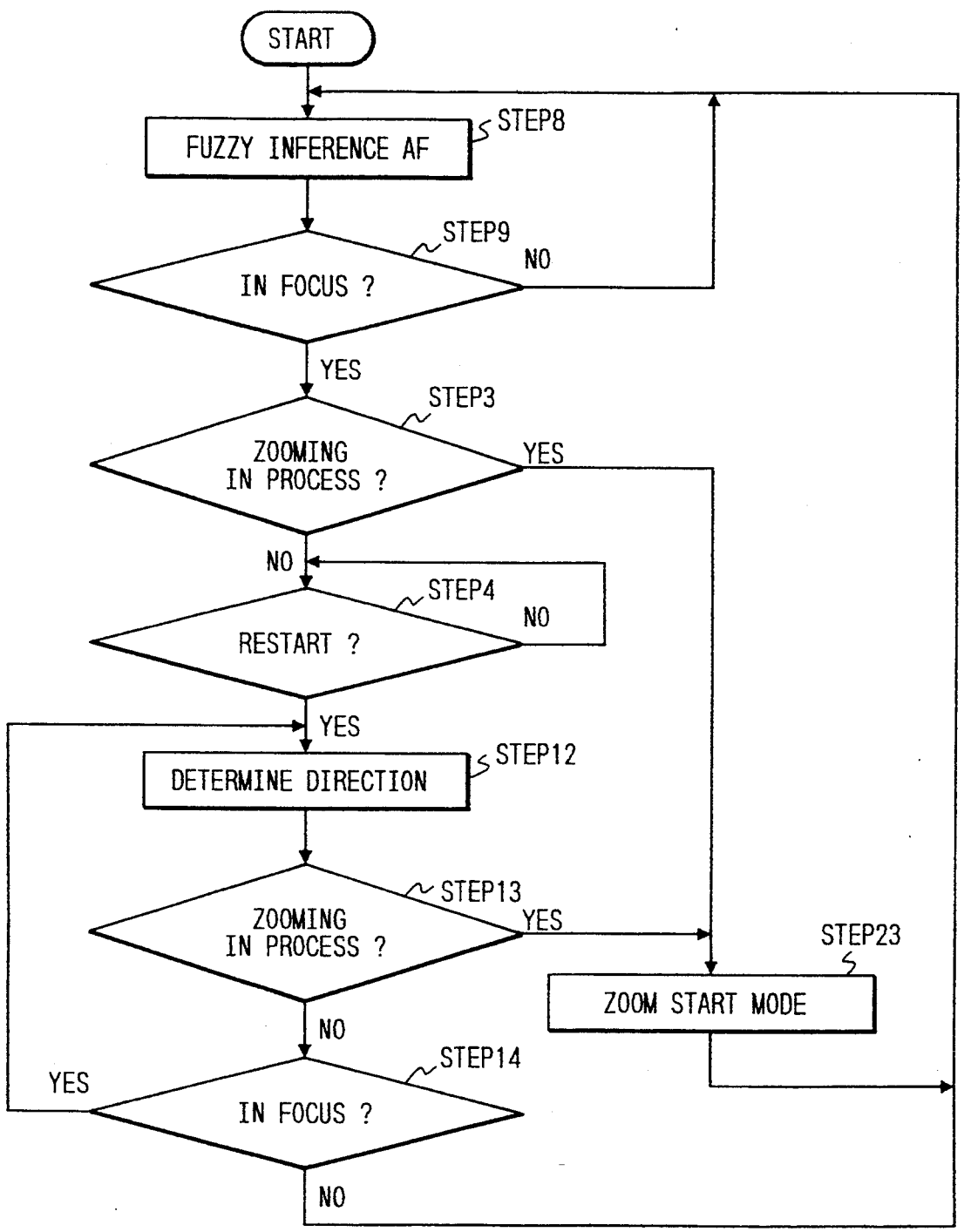

FIG. 1 is a block diagram of the automatic focusing system according to an embodiment of the present invention, and FIGS. 2A and 2B are flow charts for explaining the control operation of a logic control circuit 11 for controlling the whole system shown in FIG. 1.

Referring to FIG. 1, a photographing lens system 1 consists of a focusing lens group (to be referred to as a focusing lens hereinafter) 1a and a zoom lens group (to be referred to as a zoom lens hereinafter) 1b for zooming. The focusing lens 1a is driven in the direction of an optical axis by an instruction from the logic control circuit 11 to be described later through a focus driving circuit 15. The zoom lens 1b is also driven by an instruction from the logic control circuit 11 to be described later and is shifted by a zoom motor 20 through a zoom driving circuit in the direction of an optical axis. An iris 2 is provided to control the quantity of incident light. The iris 2 serves to set a video signal at a constant level and is operated by driving an iris driving circuit 13 through an iris control circuit 12 and activating an ig meter 14.

The incident light comes through the focusing lens 1a, the zooming lens 1b, and the iris 2 and forms an image on the image sensing plane of a solid-state image sensor 3 which is a CCD or the like. The image thus formed is converted into an electrical signal. The electrical signal (an image or video signal) is amplified by a preamplifier 4 up to a given level. The amplified signal is supplied to a processing circuit 5. The processing circuit 5 performs a signal processing action on the image signal to convert it into a standard TV signal form. The signal thus processed is output from a video output terminal and output to an electronic viewfinder (hereinafter referred to as EVF), the recording and reproducing processing circuit of VTR with a built-in camera or the like.

An object discriminating filter 6 is a total band filter which is arranged to permit determination of the degree of contrast of the object from the video signal output from the preamplifier 4. As will be described later herein, the filter 6 produces information required in controlling a process of setting membership functions for determining an in-focus state and a focus motor driving speed. A band-pass filter 7 is arranged to extract from the video signal a high-frequency component to be used for detecting the state of focus.

The output of the preamplifier 4 is supplied also to a blur width detecting circuit 8. The blur width detecting circuit 8 is arranged to measure the blur width of an object image formed on the image sensing plane and to produce information on the width of the edge part of the object image. The width of the edge part decreases accordingly as the state of focus comes closer to an in-focus point. Therefore, the focus can be adjusted by driving and shifting the position of the focusing lens 1 in such a way as to minimize the width of the edge part.

The details of this focus adjusting action are well known and have been disclosed, for example, in Japanese Laid-Open Patent Application No. 62-103616 and No. SHO 63-128878, U.S. Pat. No. 4,804,831 and U.S. patent application Ser. No. 121,624 filed on Nov. 17, 1987.

The output of the total band filter, the high-frequency component signal and the blur width signal are supplied to a gate circuit 9 which is arranged to set within the image sensing plane a focus detecting area (or a distance measuring frame) and a peak detecting circuit 10. These circuits 9 and 10 thus produce the peak values and integrated values of these signals obtained from within the distance measuring frame. These outputs of the peak detecting circuit 10 are supplied to a logic control circuit 11, which performs overall control over the whole system and is, for example, composed of a microcomputer. In addition to these input data, the logic control circuit 11 receives as input data the detected values obtained by a focusing lens encoder 18, an iris encoder 17 and zoom encoder 19.

It is preferable that the distance measuring frame (focus detecting area) is set in accordance with the depth of field and the state of focus. For this purpose, the logic control circuit 11 detects the depth of field from various data obtained from an encoder arranged in the optical system described above, and supplies an area switching signal to the gate circuit 9 in order to set a focus detecting area suited to the detected depth of field. For example, when the depth of field is large or the state of focus is low, the focus detecting area is set large; when the depth of field is small or the state of focus is high, the focus detecting area is set narrow.

In accordance with the time-serial changes of these data, the logic control circuit 11 determines the speed, direction, stopping and restarting of a driving action on the focusing lens 1a. Then, the circuit 11 supplies a focus driving circuit 15 with a control signal according to the result of the determination. In accordance with the control signal, the focus driving circuit 15 drives the focus motor 16 to shift the focusing lens 1a.

Next, with reference to FIG. 2A, the flow of the control operation of the logic control circuit 11 is described as follows: In FIG. 2A, a step 1 is a data computing routine. At step 1, the analog outputs of the object distinguishing filter 6, the band-pass filter 7 and the blur width detecting circuit 8 are A/D (analog-to-digital) converted for every field into data required for focusing. More specifically, the detected value of the high-frequency component of the video signal, that of the blur width of the object image and their difference values are computed respectively.

A step 2 is a routine whereby the operating mode of the flow of focus control is determined and is shifted to an applicable predetermined routine. A block 20 is a routine called a restart mode and consists of steps 3 and 4.

At the steps 3 and 4: The logic control circuit 11 decides, after an in-focus state is attained, whether the focus motor 16 is to be restarted according to changes in the above-stated input signals. After that, the mode is shifted either to a direction-and-focus determining mode or a zoom start mode as will be described later.

A block 21 consists of steps 8 and 9 and is a routine whereby the actual speed of the focus motor 16 is controlled and the state of focus is determined with a fuzzy inference. This routine forms the core of the flow of focus control. This routine is called an inference mode, the details of which will be described later herein.

A block 22 which consists of steps 12, 13 and 14 are the direction-and-focus determining mode. The flow of control comes to this mode when the focus motor 16 is determined to be restarted at the above-stated restart mode block 20. When the lens is determined to be in focus by this block 22, the control mode is shifted to the inference mode.

A block 23 which consists of a step 18 is called the zoom start mode. This is a routine whereby the focus motor 16 is restarted in a case where restart conditions are satisfied at the time of zooming toward a telephoto end position. The flow coming from the restart mode block 20 or the direction-and-focus determining mode block 22 is then shifted to the inference mode block 21.

Steps 5 to 7, 10, 11, 15 to 17 and 19 are routines whereby an applicable control mode is set according to the results of the above-stated four control routines.

A step 20 is a routine for actually driving the focus motor 16 in accordance with the speed and the direction determined through the processes described.

With the logic control circuit 11 arranged as described above, the flow of control is executed as follows: At the step 1: The control circuit 11 takes therein the data including the detected value of the high-frequency component of the video signal, that of the blur width of the object image, the difference value of the high-frequency components of the video signal and the difference value of the blur width signals of the object image. At the step 2: The focus control mode is detected. A control routine applicable to the control mode is selected.

In a case where the restart mode is selected, the flow proceeds to the restart mode routine block 20. At the step 3: A check is made to determine if a zooming action is in process. If so, the flow comes to the step 7 without determining the restart. At the step 7: The control mode is set in the zoom start mode to permit zooming. After setting the control mode, the flow comes to the step 20 to cause the focus motor 16 to be driven.

Further, if no zooming action is found at the step 3, the flow proceeds to the step 4. At the step 4: A check is made to find from changes of the input signal data if the state of focus deviates from an in-focus state. In other words, a discrimination is made between necessity and nonnecessity for restart of the focus motor. If the restart is necessary, the flow comes to the step 6 to set the control mode to a restart mode 20 and the restart of automatic focusing.

More specifically, in a case where the restart is decided with a change found in the input information at the step 4, the control mode is set to the direction-and-focus determining mode at the step 5. In the direction-and-focus determining mode block 22, a zoom start mode is set at the step 15 if the camera is found to be in the process of zooming at the step 13. Then, the zoom start program 23 is executed. After that, the flow comes to the step 19 to set and carry out the mode of focusing by the fuzzy inference. If the camera is found not in the process of zooming at the step 13 of the direction-and-focus determining block, the flow comes to the step 14 to determine if the image is in focus. If the image is found to be in focus the direction-and-focus determining action of the block 22 is again performed. If the image is not found to be in focus at the step 14, the flow comes to the step 17 to set the mode of detecting focus by the fuzzy inference and the control flow shifts to that mode. After that, the control operation is performed in accordance with the control algorithm of the block 21.

In a case where the focus motor is determined to be not restarted with no change detected at the step 4 of block 20, the flow comes to the step 6 to set the restart mode. Then, the flow of control from the step 3 is executed within the block 20 to make a check for a zooming action or no zooming action and also for any change in input information calling for a restart. With the various modes having been thus set and changed, the flow comes to the step 20 to drive and control the focus motor 16 within the block 24.

If the control mode is found to be the fuzzy inference mode at the step 2, the flow proceeds to the fuzzy inference mode block 21. Then, at the step 8: A driving speed is set for driving the focusing lens 1 to an in-focus point. The focusing lens 1 is driven accordingly. At the step 9: A check is made for an in-focus state. If the image is found to be in focus, the flow proceeds to the step 10 to set the restart mode.

Further, if the image is found to be out of focus at the step 9, the flow proceeds to the step 11 to set the control mode to the fuzzy inference mode. Then the focusing lens driving speed is set on the basis of an in-focus point predicted by the fuzzy inference. The flow then comes to the step 20 to drive and control the focus motor 16 accordingly.

After obtaining data of various kinds, if the control mode is found to be in the direction-and-focus determining mode 22, the flow comes to the step 12 to determine the focus motor restart direction. This direction-and-focus determining mode is set at the step 5 of the restart mode block 20.

After the focus motor restart direction is decided at the step 12, the flow comes to the step 13 to determine if a zooming action is in process. If the camera is found to be under a zooming operation at the step 13, the flow comes to the step 15 to decide the control mode to be shifted to the zoom start mode of the block 23. Further, if the image is not found to be in focus at the step 14, the flow comes to the step 17 to set the control mode in the mode of detecting focus by the fuzzy inference. The flow comes to the block 21 to execute the steps 8 to 11. The flow then comes to the block 24 to control the focus motor 16.

If the image is found to be in focus at the step 14, the flow comes to the step 16 to retain the direction-and-focus determining mode. The flow then comes to the step 20 to determine the direction by driving the focus motor 16.

In a case where the control mode is found at the step 2 to be set to the zoom start mode of the block 23, the flow comes to the step 18. At the step 18: A zoom start routine is executed by driving a zoom lens. Following the step 18, the flow proceeds to the step 19 to set the control mode to the fuzzy inference mode. The flow then comes to the step 20 to drive the focus motor 16.

After each of the modes is set in the manner as described above and the focus motor 16 is driven, the flow comes back to the step 1 to renew all the input data. Then, the above-stated flow of control is repeated.

After obtaining the data as mentioned above, a control mode is determined and selected at the step 2. The flow then comes to the block 20, 21, 22 or 23 to set the applicable operation mode. After that, each process is executed within the applicable block. Then, the flow comes from the process of each block to the focus motor driving control block 24 to drive the focus motor 16.

The flow chart of FIG. 2A shows in outline the data inputs at the step 1; the process of setting the control mode at the step 2 after obtaining the data inputs; selection and execution of the operation modes of varied kinds at the steps 3 to 19; and focus motor driving control at the step 20.

The flow chart of FIG. 2B summarizes only the concrete actions of the control operation. In FIG. 2B, the steps indicated by the same step numbers as in FIG. 2A are identical with those of FIG. 2A.

Referring to FIG. 2B, the AF action is controlled after the steps 1 and 2 with the flow of FIG. 2A having been started. At the step 8, the focus detecting action is performed on the basis of the fuzzy inference. At the step 9, the focus detecting action is allowed to continue until an in-focus state is determined.

When the in-focus state is determined at the step 9, the flow comes to the step 3 to make a check to find if a zooming action (operation) is being performed. If so, the flow comes to a step 23 to carry out the zooming action. After that the flow comes back to the fuzzy inference focus control mode of the step 8. If no zooming operation is found at the step 3, the flow proceeds to the step 4 to decide whether or not the restart is necessary. If the restart is decided to be necessary because of a change in the input information, the flow proceeds to the step 12 to decide the direction in which the focus lens is to be driven. Following this, a check is made again to find if any zooming action (operation) is being performed at the step 13. If so, the flow comes to the step 23 without driving the focusing lens immediately and the zoom action is performed at the step 23. If not, a check is again made to determine if the image is in focus. If so, the flow comes to the step 12 to decide the direction again. If not, the flow comes to the step 8 to adjust focus in the fuzzy inference focus detecting mode by driving the focusing lens in the direction decided.

Next, referring to FIGS. 3, 4, 5A to 5G and 6, the following describes the control action performed on the focus motor 16 according to the fuzzy inference shown in at the step 8 in FIG. 2A.

Figure 3:
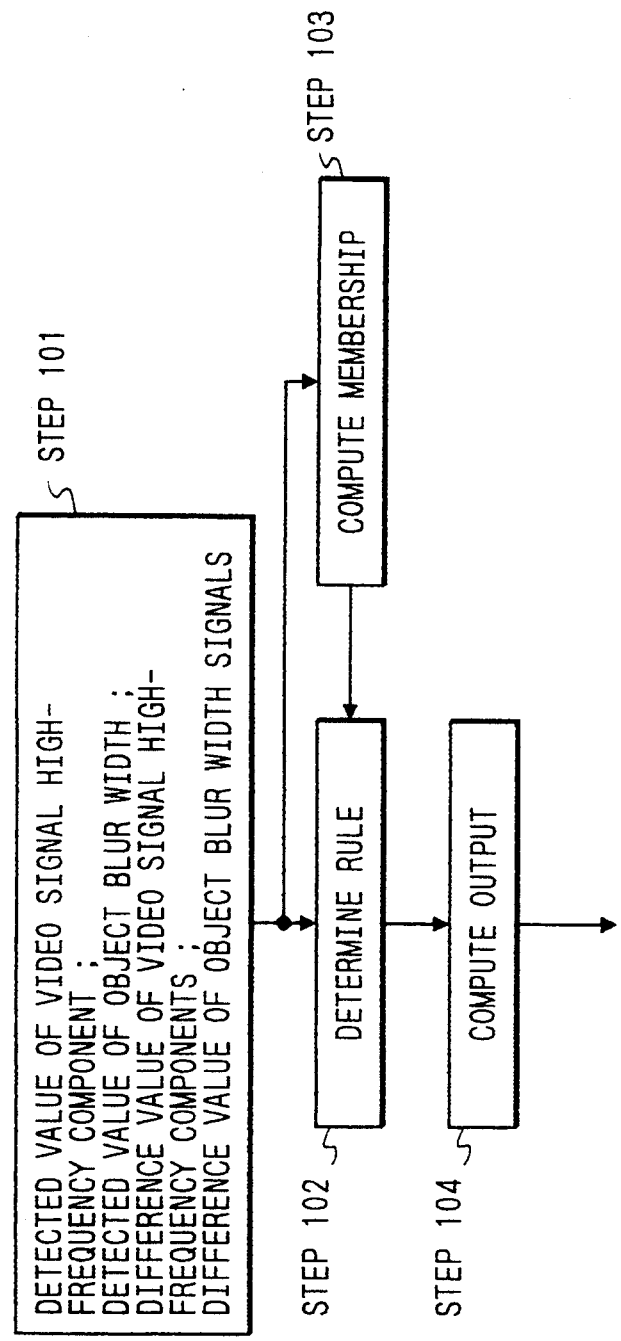
FIG. 3 is a flow chart showing the focus motor speed control sequence by the fuzzy inference.

FIG. 3 shows the flow of control performed with the fuzzy inference. The step 101 of FIG. 3 is a routine of obtaining data of membership functions to be used for determining a rule at a step 102.

At the step 101: The detected value of the high-frequency component of the video signal, that of the blur width of the object image and the difference values of them are obtained in the same manner as in the case of the step 1 of FIG. 2A.

At steps 102, 103 and 104: The fuzzy inference is made by using these data to finally determine the speed and direction of the focus motor.

Figure 4:
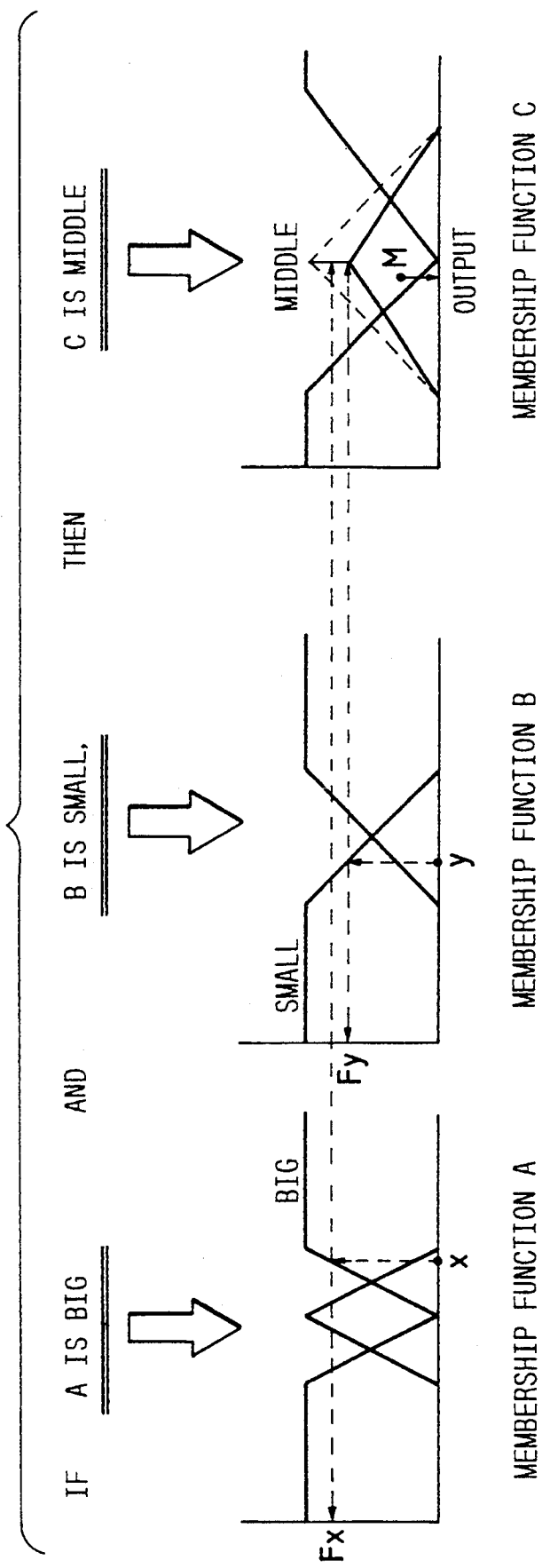
FIG. 4 explains the rules of the fuzzy inference and a basic computing operation performed according to the membership function.

The fuzzy inference is made as shown in FIG. 4. Assuming that a rule is set for some data A and B in general as "if A is big and B is small, then C is middle", the probability Fx of the condition that input data x is "big" is first obtained from a membership function which is defined for the data A. The probability Fy of the condition that input data y is "small" is likewise obtained for the data B. Next, the probability of the condition that a membership function C which is the output of the rule is "middle" is obtained from the probability values Fx and Fy which have already been obtained.

More specifically, the rule has the probability values Fx and Fy as its inputs. Therefore, a line representing the probability of that the membership function C is "middle" is compressed as shown in FIG. 4 by applying the smaller of the values Fx and Fy. Then, the barycenter or centroid value M of an area which is defined by the external figure and the coordinate axis of the compressed output membership function C is obtained. The speed and direction of the focus motor 16 are then obtained from the coordinate x of the centroid value M.

Referring again to FIG. 3, the step 103 is a routine for membership computation by which the probability of the condition that each of the input data is, for example, "big" or "small" is obtained from the membership functions set within the logic control circuit. The step 102 is a determining routine for obtaining the logical sum or logical product of the probability values of the membership functions. The step 104 is an output computing step which can be considered to be a routine of determining a focus motor speed and direction by obtaining the probability of the output membership function from the logical sum or logical product of the each of membership functions obtained at the step 102 and by performing a centroid computation on the external figure.

The above-stated method for making determination has been described, for the sake of expediency, to use a single rule consisting of two input membership functions and one output membership function. In actuality, however, the embodiment determines the speed and direction of the focus motor 16 by using six input membership functions and one output membership function as shown in FIGS. 5A to 5G and 13 rules as shown in FIG. 6.

With a plurality of rules thus provided, the output membership function is obtained in an external figure which is formed by superposing on each other all the external shapes obtained after completion of the determining processes for all the conditions. Then, the focus motor speed and direction are obtained as outputs from the centroid of the superposed external figure.

Among FIGS. 5A to 5G, FIG. 5A shows the membership function of the detected blur width value ES of the edge part of the object image. It includes three areas S (small), M (middle) and B (big). The probability is determined for each of the three areas.

Figure 5A:
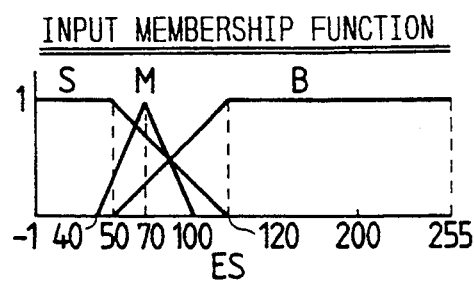
FIGS. 5A to 5G explain computing operations performed according to the membership function used for the fuzzy inference according to the present invention.
Figure 5B:
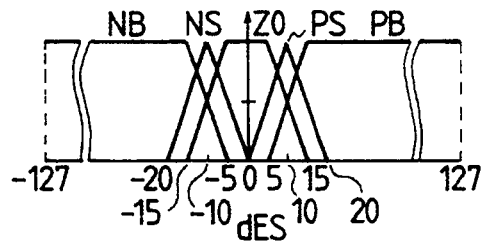

FIG. 5B shows the membership function of the difference value dES, i.e., a changing degree, of the blur width value ES. It includes functions NB (negative big) and PB (positive big) which indicate respectively the probability of that the difference value is big in the negative direction and in the positive direction; and functions NS (negative small) and PS (positive small) which indicate respectively the probability of that the difference value is small in the negative direction and in the positive direction. A membership function Z0 (zero) indicates the probability of being in the neighborhood of a zero point.

Figure 5C:
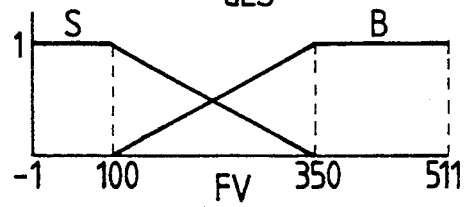

FIG. 5C shows the membership function of the detected value EV of the high-frequency component of the video signal. The probability within each area is determined for the two functions S (small) and B (big).

Figure 5D:
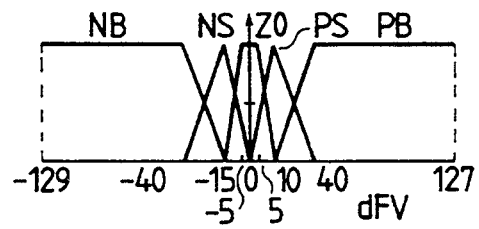

FIG. 5D shows the membership function for obtaining the difference value of the detected value FV of the high-frequency component, i.e., a changing state of the component. Like in the case of FIG. 5B, the difference value is evaluated by functions indicating the probability of each of the areas NB, NS, Z0, PS and PB.

Figure 5E:
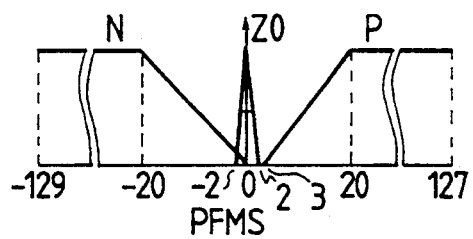

FIG. 5E shows the membership function of a value PFMS which corresponds to the length of delay time after an instruction for reverse rotation of the focus motor is issued and before the result of the instruction is obtained. The value is evaluated for each of three areas including a negative range N, a positive range P and a range Z0 which is in the neighborhood of a zero point.

Figure 5F:
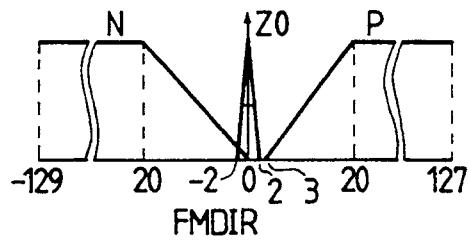

FIG. 5F shows the membership function of the rotating direction FMDIR of the focus motor. Like in the case of FIG. 5E, the probability of the rotating direction is evaluated for each of three areas including a negative range N, a range Z0 which is in the neighborhood of a zero point and a positive range P.

Figure 5G:
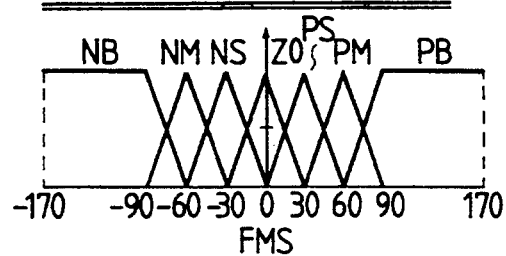

FIG. 5G shows the membership function of the speed FMS of the focus motor 16 to be obtained as an output. Three speed ranges (or areas) are set in the negative direction N including an area NB (negative big), an area NM (negative middle) and an area NS (negative small). Three areas of speed are set in the positive direction (P) including an area PB (positive big), an area PM (positive middle) and an area PS (positive small). Another area Z0 is set in the neighborhood of a zero point. The probability of each of these areas is obtained accordingly.

For the six membership functions and one output membership function set as mentioned above, the probability rates of conditions are set for the focus motor speed MFS according to 13 rules shown in FIG. 6. Then, probability data obtained by the membership functions are collated with the output membership function which is shown in FIG. 5G. A figure is set by the probability values obtained by the above-stated membership functions. A centroid position of the figure is obtained as shown in FIG. 5G. Then, the focus motor is driven according to the focus motor speed FMS which corresponds to the centroid position thus obtained. In other words, the control circuit obtains the data of varied kinds including the four input data of the detected value and difference value of the high-frequency component of the video signal and those of the blur width of the object image, the data of the current driving direction of the focus motor and that of the delay time in reversely rotating the motor. Then, the evaluation values of the rules which are applicable to these data among the 13 rules of FIG. 6 are obtained respectively on the memberships functions shown in FIGS. 5A to 5F. Then, these evaluation values are finally combined on the output membership function of FIG. 5G. In the computing operation, with the evaluation values obtained for the applicable rules combined on the membership function of FIG. 5G in the same manner as in the case of FIG. 4, the AND of an area defined by these evaluation values is obtained to determine a final figure. Then, a value which is obtained on the axis of abscissa corresponding to the centroid position of this figure is selected as the focus motor speed. The focus motor is driven at this speed.

As apparent from the output membership function of FIG. 5G, the middle point of it represents a zero speed, i.e., an in-focus point. The speeds in the positive and negative directions are defined on the right and left sides of this in-focus point 0. The speed increases accordingly as the speed value point deviates further away from the in-focus point on either side thereof.

Unlike the conventional binary control, the embodiment is arranged to take into consideration all the probability data computed on the membership functions related to the conditions set and to obtain a barycentric output by attaching weight to these data. This arrangement enables the embodiment to perform agreeable focus motor control in a manner most apposite to any of varied conditions.

The foregoing describes one example of focus motor control to be performed by making a fuzzy inference. In the case of the example described, the membership functions are fixedly preset.

However, it is known that the dynamic range of the high-frequency signal component used by the embodiment sometimes greatly fluctuates depending on the picture-taking object. Further, the image blur width signal is normalized for the purpose of eliminating any adverse effect of the contrast of the object. In actuality, however, the S/N ratio of the normalized blur width signal tends to be deteriorated by a low contrast state of the object. Under such a condition, the dynamic range of it also fluctuates by the adverse effect of noises. In other words, the dynamic range decreases when the object contrast is low and increases when it is high.

Therefore, with the membership functions fixedly preset, the probability determining action might be inapposite to some object, even though it is apposite to other objects.

To solve this problem, therefore, the embodiment of this invention uses the object discriminating filter 6 as shown in FIG. 1. The degree of contrast of the object is detected by the filter 6. The input membership functions are variably set according to the degree of contrast detected. Therefore, the focus motor is controlled always by using optimum input membership functions. The further details of this are described as follows:

FIG. 7 shows in a flow chart the flow of focus motor control performed with the fuzzy inference. Steps 201 to 204 are arranged to execute routines similar to those of the steps 101 to 104 of FIG. 3.

In this case, a step 205 is added to these steps. At the step 205, the output of the object discriminating filter 6 is monitored and determined. The logic control circuit 11 obtains the result of determination through the gate circuit 9 and the peak detecting circuit 10. The output of the filter 6 which corresponds to the contrast of the object is thus detected. If the value of the output is lower than a threshold value, the object is determined to be of low contrast. In this instance, as shown by arrow marks in FIG. 8A, the areas of the membership functions for the blur width detection value ES and the high-frequency component value FV are shifted toward their "small" sides in such a way as to increase the probability of having each detected value determined to be as large as possible. This enables the system to accurately detect the state of the object, so that the driving speed of the focus motor can be accurately set without having the detection accuracy affected by the low contrast state of the object.

If the output of the object discriminating filter 6 is above the threshold value, the object is determined to be of high contrast. In that instance, as shown by arrows in FIG. 8B, the areas of the membership functions for the blur width detection value ES and the high-frequency component value FV are shifted toward their "big" sides in such a way as to increase the probability of having each detected value determined to be as small as possible. By this, the state of focus can be prevented from being erroneously determined due to a high luminance state of the object.

Further, in a case where the object is determined to be an ordinary object, membership functions are set in middle areas as indicated by broken lines in FIGS. 8A and 8B.

The use of fuzzy inference is advantageous for control involving such ambiguities that can hardly be expressed by the binary notation. However, in cases where the detected data tends to be varied by different conditions, a data computing operation loses its reliability and the intrinsic advantage of fuzzy inference is hardly attainable. Whereas, this invention solves this problem by variably setting the membership functions according to the contrast of the object. In accordance with this invention, therefore, the control can be accomplished with the naturalness of the fuzzy inference.

With the input membership functions arranged to be varied according to the degree of contrast of the object in controlling the focus motor with the fuzzy inference as described above, the focus motor can be controlled always in an optimum manner irrespectively of the condition of the object. The advantageous feature of fuzzy control can be fully attained in focusing.

In the case of the first embodiment described above, the input membership functions are corrected according to the result of detection of the condition of the picture-taking object. However, the invention is not limited to such arrangement. The arrangement may be changed to correct the output membership function instead of correcting the input membership functions.

Further, it is possible to vary the rules instead of varying the membership functions. More specifically, the conditions for the membership functions of the detected blur width value and the high-frequency component value are changed and lowered for a low-contrast object as follows: The term "big" of the conditions is changed to "middle" and the term "middle" to the term "small". The output membership determining point is also shifted by one step to a slower point. By this, the speed of the focus motor is kept at a lower speed for the purpose of preventing hunting. In the event of a high-contrast object, on the other hand, the conditions for the membership functions of the detected blur width value and the high-frequency component value are changed and raised as follows: The term "small" is changed to "middle" and the term "middle" to "big". The output membership determining point is raised by one step. By this, the speed of the so-called hill-climbing control is increased as much as possible for the purpose of preventing such a faulty action that the focusing lens comes to a stop before an in-focus point is attained.

In the case of the embodiments described, either the detected value of the high-frequency component and that of the blur width or the output membership function of the speed of the focus motor is arranged to be variable according to the contrast of the object image. However, the fineness and accuracy of control can be furthered by variably setting the membership function of any other element that has its characteristic conspicuously change according to changes taking place in ambient conditions.

In the above-described embodiment, the speed and rotating direction of the focus motor 16 are determined based on the six input membership functions, as shown in FIGS. 5A to 5G, a single output membership function, and 13 rules, as shown in FIG. 6. In this manner, when a plurality of rules are provided, the output membership function takes the form obtained by superposing all the external figures on each other after all the rules are determined. The speed and rotating direction of the focus motor as outputs are obtained from the centroid of the external figure.

However, according to the present invention, the centroid computing operation for obtaining these outputs can be greatly simplified by approximation of the output membership functions as will be described later. The most significant feature of the present invention resides in this point.

As has been described above, when the external figure of the finally evaluated output membership function is to be obtained, the degree at which the plurality of output membership functions conform with the plurality of rules is obtained, and the external figures of the output membership functions are superposed in accordance with the obtained degree of conformity. The control amount of the focusing lens can be obtained by this centroid computing operation. The output membership function generally has a complicated external figure, as shown in FIG. 9B.

In order to obtain a control amount that accurately reflects the rules that have been determined in obtaining this complicated figure, the centroid of the output membership function external figure must be accurately calculated. When the centroid of such a complicated figure as this is to be calculated in a software manner, the operation program size is greatly increased, the processing time is prolonged, and thus the memory capacity must be very large. In addition, it is difficult to perform calculation at a high precision. As a result, it is difficult to realize a system which operates at a high speed at a high precision and requires only a small memory area. In particular, when control is to be performed using a one-chip microcomputer, these problems pose serious effects. Therefore, it is difficult to perform high-precision output computing operation at a high speed.

The present invention solves the above problems, simplifies centroid computation of the output membership functions which is originally complicated, shortens the processing time, decreases the program capacity to enable reduction in the program memory area, realizes a high-speed, high-precision centroid computing means, and enables control using the fuzzy inference in a software manner. The operation algorithm of the present invention will be described in detail.

Figure 9A:
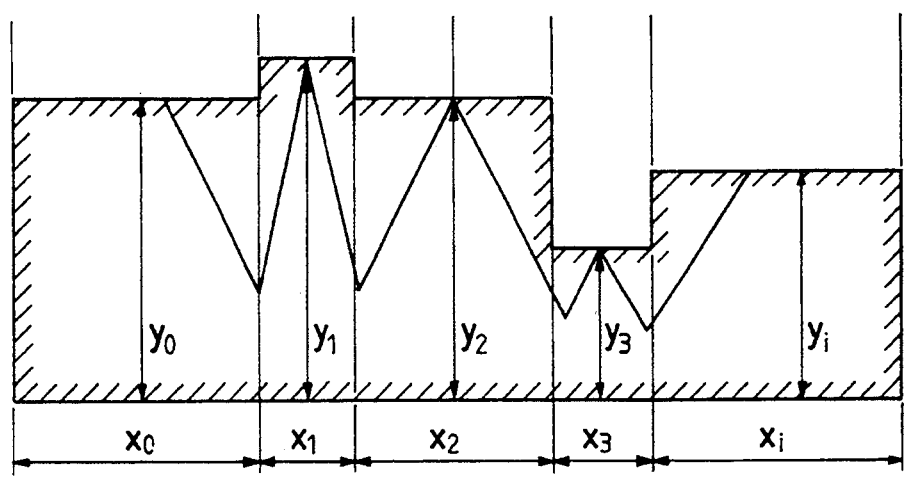
FIGS. 9A and 9B explain a means for approximating an output membership function according to the present invention.
Figure 9B:
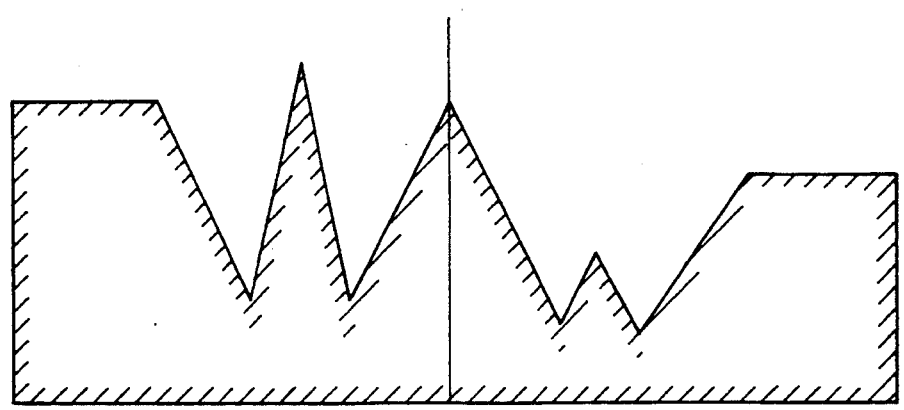

Referring to FIG. 9A, the output membership function shown in FIG. 9B is divided along the direction of x-axis at predetermined intervals $x_0$ to $x_i$. The peak values of the divisional areas are set as representative evaluation values $Y_0$ to $Y_i$, respectively. The areas defined by the representative evaluation values (hatched portion in FIG. 9A) is approximated to the external figure of the output membership function of FIG. 9B, and centroid computation is performed.

It is preferable that each divisional area $x_i$ divided along the axis of abscissa includes one peak and is divided from an adjacent divisional area by the bottom of the normal output membership function, as shown in FIG. 9A.

When the approximated membership function obtained by approximating the output membership function is used, centroid computation can be greatly simplified. As a result, the program is simplified, the operation speed is increased, the memory area required for computation processing is reduced, and an error in computation in itself is decreased. A large microcomputer for the purpose of computation and control becomes unnecessary, and control can be performed with e.g., a one-chip microcomputer.

In this manner, by using the approximated output membership function, centroid computation in non-fuzzy inference can be simplified as follows:

$$G = \sum_{i=0}^{k} S_i r_i / \sum_{i=0}^{k} S_i \quad (1)$$

where $S_i = x_i y_i$ $$r_i = \sum_{i=0}^{k} x_{i-1} + x_i/2$$

As has been described above, when centroid computation is performed by setting an approximated output membership function, even if inference and computation are performed in a software manner, a processing speed which is sufficient at the practical level can be obtained without losing the features of the fuzzy inference and decreasing the operation precision.

Figure 10A:
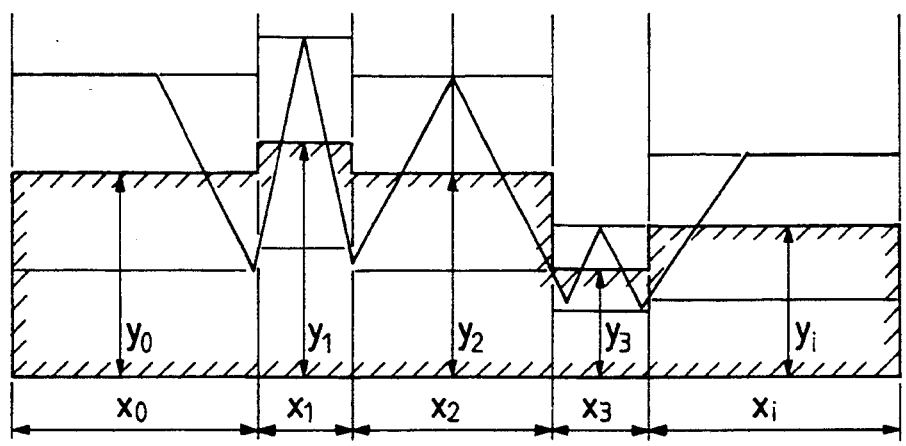
FIGS. 10A, 10B, and 10C explain another means for approximating the output membership function according to the present invention.

In the above embodiment, when the output membership function is to be approximated, its evaluation values $Y_0$ to $Y_i$ are set as the peak values of the respective divisional areas along the x-axis, as shown in FIG. 9A. However, the present invention is not limited to this. For example, as shown in FIG. 10A, an intermediate value between a peak value and the bottom value of each area divided along the x-axis may be set as a representative evaluation value, and centroid computation may be performed.

Figure 10B:
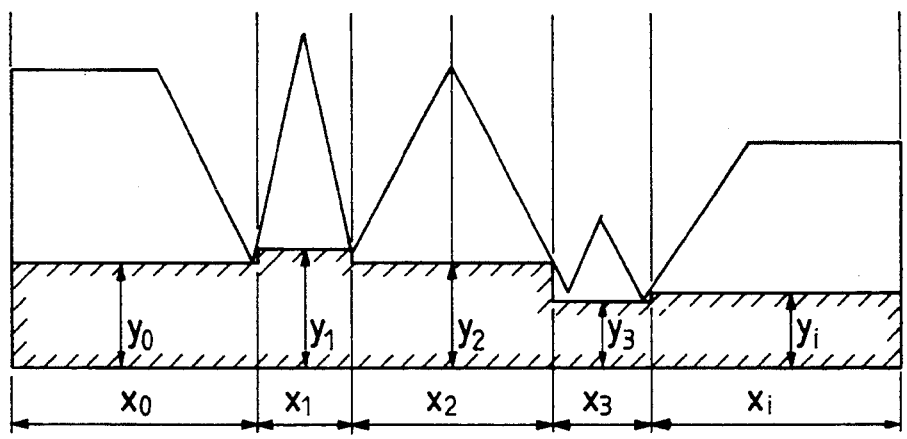

Similarly, as shown in FIG. 10B, the bottom value of each area may be set as the representative evaluation value, and centroid computation may be performed.

Figure 10C:
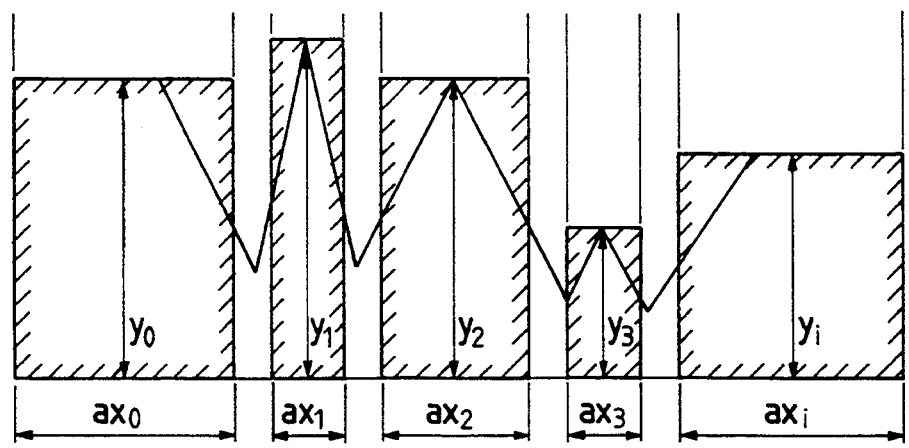

In the above example, the divisional areas (intervals) $x_i$ are continuously set without any space in therebetween. However, the width of each area may be changed by multiplying each divisional area $x_i$ along the x-axis by a certain coefficient. More particularly, as shown in FIG. 10C, the width of each area along the x-axis may be narrow by a product obtained by multiplication by a coefficient a.

In this case, the approximated output membership function is indicated by the following equation:

$$G = \sum_{i=0}^{k} S_i r_i / \sum_{i=0}^{k} S_i \quad (2)$$

where $S_i = a x_i y_i$ $$r_i = \sum_{i=0}^{k} x_{i-1} + x_i/2$$

In this manner, various methods are possible as an approximating method for an output membership function. A method which eliminates the error may be selected as needed in accordance with the figure and setting of the original membership function, and approximation may be performed using the selected method.

As has been described above, according to the control system of the present invention, in a non-fuzzy process in fuzzy inference done in a system that performs control using fuzzy inference, the external figure of an output membership function is approximated to an appropriate figure to simplify centroid computation which is performed for obtaining an output evaluation value. Then, the operation program is simplified and its size is reduced, the computation processing speed is increased, and the program/data storage area can be reduced.

As a result, e.g., a versatile one-chip microcomputer can be used as a control microcomputer, and control using the fuzzy inference can be easily realized in a software manner in the versatile microcomputer.

What is claimed is:

1. A control system for driving a control target on the basis of a plurality of detection data comprising:
   (a) detecting means for detecting the plurality of detection data;
   (b) first computing means for quantitatively computing a degree at which the plurality of detection data output from said detecting means conform with a preset condition in accordance with a predetermined function and a generating an output function;
   (c) second computing means for receiving said output function and providing a first external figure therefrom and operable in accordance with a predetermined approximation algorithm for providing a second external figure from said first external figure and for computing a centroid of said second external figure;
   (d) driving means for driving the control target based on the computed value of said centroid.

2. A control system according to claim 1, wherein said first computing means has a predetermined rule, an input membership function and an output membership function and generates said output function by performing an operation on said plurality of detection data on the basis of said predetermined rule and said input membership function and putting the operation result in said output membership function.

3. A control system according to claim 2, wherein said first computing means puts the operation result obtained by putting said plurality detection data in said predetermined rule, in said input membership function and limits a figure of said output membership function.

4. A control system according to claim 3, wherein said second computing means performs a predetermined approximation process on the figure defined by said output membership function, limited by said first computing means, and then performs the computation of the centroid.

5. A control system according to claim 4, wherein said first computing means has the plurality of predetermined rules and the plurality of input membership functions.

6. A control system according to claim 5, wherein said driving means includes a motor.

7. A control system according to claim 1, wherein said control system is a camera and wherein said control target is a lens.

8. An automatic focusing control system comprising:
   (a) detecting means for detecting a signal which changes in accordance with a state of focus;
   (b) first computing means for collating detection data output from said detecting means with a predetermined condition and outputting control data to be used for controlling the state of focus in accordance with a degree at which the detection data output from said detecting means conforms with the predetermined condition;
   (c) second computing means for receiving said control data and operable in accordance with a predetermined approximation algorithm for computing a quantitatively simplified form of said control data outputted from said first computing means;
   (d) focus control means for controlling the state of focus based on said quantitatively simplified form of said control data.

9. A system according to claim 8, wherein said first computing means has a predetermined rule, an input membership function and an output membership function and generates said output function by performing an operation on said plurality of detection data on the basis of said predetermined rule and said input membership function and putting the operation result in said output membership function.

10. A system according to claim 9, wherein said first computing means puts the operation result obtained by putting said plurality of detection data in said predetermined rule, in said input membership function and limits a figure of said output membership function.

11. A system according to claim 10, wherein said second computing means performs a predetermined approximation process on the figure defined by said output membership function, limited by said first computing means, and then performs the computation of the centroid.

12. A system according to claim 11, wherein said first computing means has the plurality of predetermined rules and the plurality of input membership functions.

13. A system according to claim 12, further comprising a focus lens for focus adjustment and a motor for driving said focus lens, and wherein said focus control means controls a driving speed of said focus lens on the basis of an output of said second computing means.

14. A system according to claim 13, wherein said detection data includes a high frequency component and an edge width component of a video signal.

15. A system according to claim 14, wherein said detection data further includes difference between the high frequency components, difference between the edge width components, a speed of the focus motor and information of driving direction of the focus motor.

16. A control apparatus for controlling driving of a control target with a fuzzy inference, comprising:
(a) first operation means for performing an operation on a plurality of input information on the basis of a predetermined input membership function and a predetermined output membership function and outputting predetermined control information;
(b) second operation means for, when the operation based on the output membership function is performed by said first operation means, performing a predetermined approximation process on the output membership function and then performing an operation of a centroid; and
(c) control means for driving said control target on the basis of an output of said second operation means.

17. A control apparatus according to claim 16, wherein said first operation means has predetermined rule and generates the control information by performing an operation on said plurality of input information on the basis of predetermined rule and said input membership function and putting the operation result in said output membership function.

18. A control apparatus according to claim 17, wherein said first operation means puts the operation result obtained by putting said plurality of input information in said predetermined rule, in said input membership function and limits a figure of said output membership function.

19. A control apparatus according to claim 18, wherein said second operation means performs the predetermined approximation process on the figure defined by said output membership function, limited by said first operation means, and then performs the operation of the centroid.

20. A control apparatus according to claim 19, wherein said control means includes driving means for driving said control target.

21. A control apparatus according to claim 20, wherein said driving means includes a motor and wherein said control means controls a speed of said motor.

22. A video camera comprising:
(a) an image pickup system;
(b) first operation means for performing an operation on a plurality of input information on the basis of a predetermined input membership function and a predetermined output membership function and outputting predetermined control information;
(c) second operation means for, when the operation based on the output membership function is performed by said first operation means, performing a predetermined approximation process on the output membership function and then performing an operation of a centroid; and
(d) control means for controlling an operation of said image pickup system on the basis of an output of said second operation means.

23. A video camera according to claim 22, wherein said image pickup system is a focus lens.

24. A video camera according to claim 23, wherein said plurality of input information include at least a focus signal which varies according to a focusing state.

25. A video camera according to claim 23, wherein said first operation means has a predetermined rule and generates the control information by performing an operation on said plurality of input information on the basis of said predetermined rule and said input membership function and putting the operation result in said output membership function.

26. A video camera according to claim 25, wherein said first operation means puts the operation result obtained by putting said plurality of input information in said predetermined rule, in said input membership function and limits a figure of said output membership function.

27. A video camera according to claim 26, wherein said second operation means performs the predetermined approximation process on the figure defined by said output membership function, limited by said first operation means, and then performs the operation of the centroid.

28. A video camera according to claim 27, wherein said control means controls start of driving, a driving speed and stop of driving of said focus lens.

29. A video camera according to claim 25, wherein said plurality of input information include a high frequency component and an edge width component of a video signal and further include difference between the high frequency components, difference between the edge width components and past driving speed and past driving direction of said focus lens.

30. A control apparatus for controlling driving of a control target with a fuzzy inference, comprising:
(a) first operation means for performing a fuzzy inference operation by putting a plurality of input information in a predetermined rule and then putting them in a membership function to perform an operation of a centroid;
(b) second operation means for simplifying a figure defined by said membership function by using an approximation operation process, before the operation of the centroid is performed by said first operation means; and
(c) control means for driving said control target on the basis of an output of said second operation means.

31. A control apparatus according to claim 30, wherein said membership function includes an input membership function and an output membership function and wherein said first operation means generates control information by performing an operation on said plurality of input information on the basis of said predetermined rule and said input membership function and putting the operation result in said output membership function.

32. A control apparatus according to claim 31, wherein said first operation means puts the operation result obtained by putting said plurality of input information in said predetermined rule, in said input membership function and limits a figure of said output membership function.

33. A control apparatus according to claim 32, wherein said second operation means performs the approximation operation process on the figure defined by said output membership function, limited by said first operation means, and then performs the operation of the centroid.

34. A control apparatus according to claim 33, wherein said control apparatus is a camera and wherein said control target is a motor for driving a lens, and said control apparatus further comprises driving means for driving said control target.

* * * * *

UNITED STATES PATENT AND TRADEMARK OFFICE
CERTIFICATE OF CORRECTION

PATENT NO. : 5,376,991

DATED : December 27, 1994

INVENTOR(S) : Kitahiro Kaneda et al.

It is certified that error appears in the above-identified patent and that said Letters Patent is hereby corrected as shown below:

Title page,

Item [63]. Change "Sep. 19, 1992" to -- Sep. 28, 1992 --.

Col. 9, line 40. Delete "of".

Col. 10, line 19. Delete "of".

Col. 10, line 22, Delete "of".

Col. 11, line 14. Change "memberships" to -- membership --.

Col. 12, line 54, Change "irrespectively" to -- irrespective --.

Col. 15, line 7, Change "narrow" to -- narrowed --.

Col. 15, line 52, Delete "a".

Signed and Sealed this

Twenty-eight Day of March, 1995

Attest:

BRUCE LEHMAN

*Attesting Officer*   *Commissioner of Patents and Trademarks*